US007583640B2

(12) United States Patent
Pecen et al.

(10) Patent No.: US 7,583,640 B2
(45) Date of Patent: Sep. 1, 2009

(54) APPARATUS AND METHOD FOR PROVIDING NOTIFICATION OF ALLOCATION OF COMMUNICATION RESOURCES IN A RADIO COMMUNICATION SYSTEM

(75) Inventors: Mark Pecen, Waterloo (CA); Mihal Lazaridis, Waterloo (CA); Sean Simmons, Waterloo (CA)

(73) Assignee: Research In Motion Limited, Waterloo (CA)

( * ) Notice: Subject to any disclaimer, the term of this patent is extended or adjusted under 35 U.S.C. 154(b) by 353 days.

(21) Appl. No.: 11/271,520

(22) Filed: Nov. 10, 2005

(65) Prior Publication Data

US 2007/0104155 A1  May 10, 2007

(51) Int. Cl.
  *H04J 3/00* (2006.01)
(52) U.S. Cl. ...................................... 370/336; 370/468
(58) Field of Classification Search ................. 370/230, 370/252, 336, 468
  See application file for complete search history.

(56) References Cited

U.S. PATENT DOCUMENTS 5,299,190 A * 3/1994 LaMaire et al. ............. 370/413

| | | |
|---|---|---|
| 5,956,642 A | 9/1999 | Larsson et al. |
| 6,563,806 B1 | 5/2003 | Yano et al. |
| 2003/0133411 A1* | 7/2003 | Ise et al. ...................... 370/230 |
| 2007/0104101 A1* | 5/2007 | Sadr ............................ 370/230 |
| 2008/0215951 A1* | 9/2008 | Oshima ....................... 714/755 |

FOREIGN PATENT DOCUMENTS

EP   0938208   8/1999

OTHER PUBLICATIONS

Noel, F.: "Higher Data Rates in GSM/EDGE With Multicarrier"; Technical Report EX024/2001, [Online] Apr. 2001, pp. 1-61, XP002368895; Chalmers Univ. of Tech., Goteborg, Sweden; Retrieved from the Internet: URL:http://db.s2.chalmers.se/download/masters/master_EX024_2001.pdf>[retrieved on Feb. 21, 2006] sections 5.3.1, 5.3.4.1, 5.3.5.2.

* cited by examiner

*Primary Examiner*—Sam Bhattacharya (57) ABSTRACT

Apparatus, and an associated method, for notifying a remote station of a communication resource allocation made to communicate data thereto. The allocation of communication resources is made across a plurality of radio carriers during time frames defined upon each of the carriers. A matrix representation of the resource allocation is made, and the matrix representation is included in an allocation message that is created and sent to the remote station.

20 Claims, 3 Drawing Sheets

APPARATUS AND METHOD FOR PROVIDING NOTIFICATION OF ALLOCATION OF COMMUNICATION RESOURCES IN A RADIO COMMUNICATION SYSTEM

The present invention relates generally to the communication of data pursuant to a high-speed data radio communication service, such as an Enhanced Data for GSM Evolution (EDGE) communication service. More particularly, the present invention relates to apparatus, and an associated method, by which to form an allocation message that is communicated to a communication station to alert the communication station of the communication resource allocation, thereby to permit the communication station to operate best to receive subsequently communicated data.

BACKGROUND OF THE INVENTION

The rapid rate at which communication technologies have evolved has permitted the development and deployment of radio communication systems capable of communicating data at high throughput rates. Data services that necessitate for their execution the communication of large amounts of data in short periods of time are increasingly able to be performed by way of a radio communication system that is capable of communicating the data at the high throughput rates. With further evolution of communication technologies, the need for the capability to communicate data at yet higher data throughput rates shall likely become possible and communication services necessitating data to be communicated at such higher data throughput rates shall correspondingly become available.

For instance, GSM (Global System for Mobile communications) cellular communication systems have been developed and widely deployed. Many GSM networks provide for GPRS (General Packet Radio Service) that permits communication of data at relatively high data rates. An extension to GPRS, referred to as EDGE (Enhanced Data for GSM Evolution), is presently undergoing deployment. EDGE-capable communication systems provide for communication of data at data throughput rates that are significantly higher than those achievable in GSM/GPRS-only communication systems. In spite of the improved communication capabilities of an EDGE-capable system, there is a continuing need yet further to increase the achievable data throughput rates by which data is communicated in a radio communication system.

An EDGE-capable communication system is operated in general conformity with an operating specification promulgated by a standards-setting body. The operating specification defines, amongst other things, a channel structure that defines channels on a radio air interface formed between communication stations operable in the communication system. Multiple carriers are available for use, defined sometimes logically in terms of mobile index allocation offsets. The channel structure includes frames, each of which is divided into time slots. Due to various requirements, even though frames and time slots are defined upon each of the multiple carriers that are available for use, communication resources that are allocated for the communication of data pursuant to a particular communication session are allocated upon a single carrier. Communication resources, to date, are not allocated upon multiple carriers or, more generally, across a plurality of mobile allocation index offsets.

Not only is a manner needed by which better to utilize communication resources available across a plurality of the multiple carriers, but there also is a need, once such communication resources are allocated, to provide notification of the allocation to a receiving station to which the data is to be communicated.

It is in light of this background information that the significant improvements of the present invention have evolved.

DETAILED DESCRIPTION

The present invention, accordingly, advantageously provides apparatus and method for use in communication of high-speed data to perform a high-speed data radio communication service, such as EDGE (Enhanced Data for GSM Evolution) data communicated in an EDGE-capable communication system to perform a data communication service.

Through operation of an embodiment of the present invention, a resource allocation message is generated, the contents of which provides notification of communication resources allocated pursuant to the communication of data, such as pursuant to the communication of EDGE data communicated to perform an EDGE communication service.

The communication resources are allocated across a plurality of radio carriers, and the allocation message includes a matrix representation of the communication resource allocation. By allocating the communication resources across a plurality of radio carriers, the likelihood of resource availability during any particular time slot is greater than the likelihood of a corresponding level of resources being available at a single carrier. The communication resource allocation is made of time slot allocations on different ones of the radio carriers is represented in the form of a matrix formed of matrix elements positioned in rows and columns, the values of each matrix element together populating a field of the allocation message.

The allocation message is communicated between communication stations that are to be parties to a communication session pursuant to which data is communicated. The allocation message, formed at, or provided to, a first communication station is communicated to a second communication station to notify the second communication station of the communication resource allocation. The matrix representation is, for instance, a straightforward mapping of the time slot allocations within a time frame across each of the plurality of radio carriers. Alternately, matrix manipulations are also performed to reduce the size of the matrix and, correspondingly, the size required of the matrix representation of the resource allocation in the field of the allocation message is also reduced.

In one aspect of the present invention, a matrix representer is provided that, responsive to an indication of the communication resource allocation, forms a matrix representation of the communication resource allocation. The matrix representation is formed of a direct mapping, or a matrix manipulation of the direct mapping, of the communication resource allocation across the plurality of carriers during a frame, or other appropriate period.

In another aspect of the present invention, a message generator receives the matrix representation of the communication resource allocation and includes the matrix representation in an allocation message that is generated by the message generator. Values of the matrix representation populate a field of the allocation message. By populating the field of the allocation message with such values, the allocation message forms a notification message that is capable of providing notification of the communication resource allocation made to communicate data.

In another aspect of the present invention, the resource allocations are dynamically made at selected intervals. Successive allocation messages, forming reallocation messages that reallocate earlier allocations of communication resources, are formed and used to provide notification of the resource allocations. When the matrix representer receives an updated, or other subsequent, indication of resource allocation, the matrix representer forms an updated matrix representation of the communication resource allocation and provides the updated matrix representation, or indications of changes to a prior matrix representation, to the message generator. The message generator uses the updated information provided thereto to populate a field of a new allocation message. The allocation message forms a notification message that provides notification of reallocation of the communication resources, forming alternately a new allocation message or an update of an earlier allocation message.

In another aspect of the present invention, the allocation message, once generated, is communicated, by way of a radio air interface, from a first communication station to a second communication station. The second communication station, a receiving station, includes a detector that detects the contents of the allocation message and the values of the matrix representation of the communication resource allocation. Values of the message are extracted and provided to a controller. The controller controls operation of the receiving station so that the receiving station is operable to receive data subsequently communicated using the communication resources allocated for the communication of the data.

The message generated by the message generator selectably includes further information, such as information identifying a starting period at which the allocated communication resources shall be available for the communication of the data. The indication is, alternately, an absolute indication or an implicit indication. The allocation message generated by the message generator further selectably includes an indication of the duration period during which the communication resources identified in the allocation message shall be allocated. The duration period is, e.g., time-based, represented in terms of a frame duration length.

In one implementation, the resource allocation is made at a network part of an EDGE-capable radio data communication system for the communication of EDGE data by the network part to a mobile station. The communication resources are allocated across a plurality of radio carriers, identified, e.g., in terms of mobile allocation index offsets (MAIOs).

By forming a matrix representation of the communication resource allocation across the plurality of radio carriers and using the matrix representation in an allocation message, a notification of the resource allocation is readily provided to a remote communication station that is to be party to a communication session during which data is to be communicated.

In these and other aspects, therefore, apparatus and associated methodology is provided for providing notification of a communication resource allocation pursuant to communication of data. A matrix representer is adapted at least to receive an indication of the communication resource allocation made for the communication of the data. The matrix representer is configured to form a matrix representation of the communication resource allocation. The communication resource allocation is made across a plurality of radio carriers. A message generator is adapted to receive the matrix representation of the communication resource allocation made by the matrix representer. The message generator is configured to generate an allocation message that includes the matrix representation of the communication resource allocation. The allocation message is for communication to provide the notification of the communication resource allocation pursuant to the communication of the data.

In these and other aspects, further apparatus and methodology is provided for a communication station operable pursuant to communication of data in a communication scheme that provides for mobile allocation index offset. A detector is configured to detect an allocation message delivered to the communication station. The allocation message includes a matrix representation of a communication resource allocation. A controller is adapted to receive an indication of detection made by the detector. The controller is configured to control operation of the communication station responsive to detections made by the detector.

Figure 1:
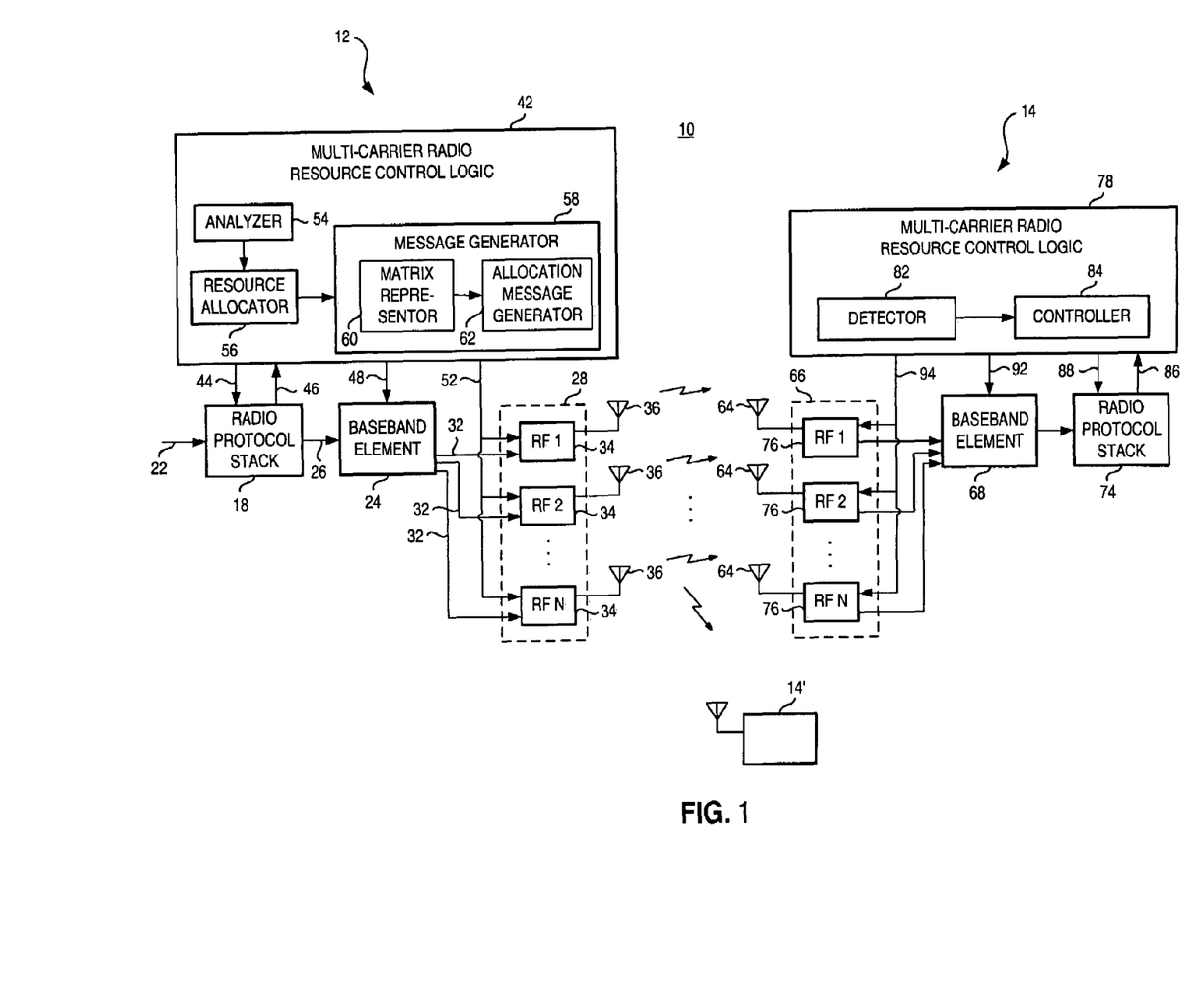
FIG. 1 illustrates a functional block diagram of an exemplary communication system that includes an embodiment of the present invention as a portion thereof.

With these and other aspects in mind, reference is made to FIG. 1 that illustrates a communication system, shown generally at 10, in which an embodiment of the present invention is operable. The communication system, in its exemplary implementation, forms a data radio communication system that operates in general conformity with the operating specification of a GSM/GPRS/EDGE (Global System for Mobile communications/General Packet Radio Service/Enhanced Data for GSM Evolution) communication scheme. In other implementations, the communication system is analogously representative of communication systems operable pursuant to other communication schemes. Accordingly, while the following description shall describe exemplary operation of the communication system with respect to its exemplary implementation, the teachings of the present invention are analogously applicable for implementation in other types of communication systems.

The communication system 10 is a multi-user communication system of which a set of communication stations, communication station 12 and communication station 14, are shown in the figure. The communication station 12 is representative of a network station, formed of elements of a network part of the communication system. The communication system 12 shall, at times, be referred to herein as a network station 12. The communication station 14 is representative of a mobile station, and the communication station 14 shall, at times, herein be referred to as a mobile station 14. Either of the communication stations 12 and 14 is capable of generating and communicating EDGE data pursuant to performance of an EDGE data service. Operation shall be described with respect to communication of data in a down-link direction, that is, from the network station to the mobile station. Operation in an uplink direction, i.e., from the mobile station to the network station is analogously carried out.

A communication station 14' is also shown in FIG. 1. The communication station 14' represents another mobile station that is capable of communicating EDGE data with the network station 12. Separate point-to-point communication sessions as well as multicast communications in which, e.g., data is communicated by the network station to both the mobile stations 14 and 14'.

Amongst the protocols set forth in the EDGE/GPRS/GSM operating specification are definitions of an EDGE channel structure. The EDGE channel structure is a TDMA (Time Division Multiple Access) scheme in which groups of eight time slots form a frame. Communication resource allocations are made by allocating time slots within a frame to communicate data during the allocated time slot or time slots. A maximum transmission rate of 59.2 kb/s per time slot is presently provided in a promulgation of the operating specification. When a communication service is to be performed, communication resources, i.e., time slots within frames define upon the carriers available for communication, are allocated for the communication of the EDGE data.

As each frame includes eight time slots, at least theoretically, all eight time slots of the frame can be allocated to a single communication session, i.e., for the communication of data between a set of communication stations, such as the communication stations 12 and 14, to perform a communication service. A maximum, theoretical transmission rate of 473.6 kb/s (8* 59.2 kb/s=473.6 kb/s) is available per frame.

In actual practice, however, allocation of all, or many, of the time slots per frame on a single carrier is unachievable. Various operating requirements of the EDGE/GPRS/GSM system require that a mobile station make various measurements during its operation. Measurements must be made, e.g., upon signals broadcast in cells adjacent to the cell in which the mobile station is positioned. The operating specifications TS 45.008 [5] and TS 45.002 [2], Annex B specify and define certain of the measurements. Time slots are also required to be allocated to perform other data and traffic services. Competition for the communication resources limits the availability of time slots, particularly contiguous time slots that are available to be allocated to effectuate a communication service.

For example, if there is a sixty percent probability of availability of a single time slot for assignment, the statistical probability of six contiguous time slots on a single carrier, i.e., a single mobile allocation index offset, within a frame being available is only 4.67 percent. The probability of all eight contiguous time slots of a frame on a single carrier being available drops to 1.68 percent. Even if limitations due to the need of a mobile station to make measurements is disregarded, there is, therefore, a statistically small likelihood that multiple, contiguous time slots would be available on a single carrier for allocation to communicate data pursuant to a particular EDGE communication service.

Contiguous time slots, or at least other additional time slots, are sometimes available on other radio carriers. By permitting the allocation of time slots across a plurality of radio carriers for the communication of data pursuant to a single communication session, an increased data throughput rate is achievable. When communication resources are allocated across a plurality of carriers, however, the communication stations that are parties to a communication session must be operable in manners to successfully communicate the data. All of the communication stations that are parties to the communication of the data must, therefore, have knowledge of the communication resource allocations made across the plurality of radio carriers. Pursuant to operation of an embodiment of the present invention, a manner is provided by which to make notification of the communication resource allocations across the radio carriers so that the communication stations that are parties to a communication session are notified of the communication resource allocation.

The communication stations 12 and 14 are functionally represented in FIG. 1, formed of functional elements that are implementable in any desired manner. Additionally, the functions performed by the various functional elements need not necessarily be positioned together at a common physical entity but, instead, can be distributed across several physical entities. The elements shown to form portions of the network station 12, e.g., need not be positioned at a single physical entity but rather can be distributed across several physical entities, such as, for instance, across a base station controller and a base transceiver station of the network.

The transmit chain portion of the network station is represented in FIG. 1 and is here shown to include a radio protocol stack 18 to which user application data is applied by way of the line 22. The application data is for communication to one or more mobile stations pursuant to one or more EDGE communication sessions. The radio protocol stack includes various logical layers including a radio resource management (RRM) layer. The network station also includes a baseband element 24 to which data are provided, here indicated by way of the lines 26. The baseband element performs various baseband operations, such as baseband processing, modulation, and channel coding.

The network station also includes a radio element 28. The data, once operated upon by the baseband element, is provided to the radio element, here indicated by way of the lines 32. The radio element is formed, at least functionally, of radio frequency transceiver front ends 34. N radio transceivers are shown in FIG. 1. Each of the radio transceivers is coupled to an antenna transducer 36. The transducers transduce the data into electromagnetic form for communication to one or more mobile stations 14.

The network station 12, pursuant to an embodiment of the present invention, also includes a multi-carrier radio resource control logic element 42. The element 42 is functionally coupled to the radio protocol stack 18, here indicated by way of the lines 44 and 46. The logic element is also coupled to the baseband element 24, here indicated by way of the lines 48. And, the logic element is further coupled to the radio element 28, here indicated by way of the lines 52. The logic element performs various functions and, in the exemplary implementation, is embodied at a radio resource management logical layer.

The logic element is here shown to include an analyzer 54, a resource allocator 56, and an allocation message generator 58. The functions performed by the parts of the logic element are carried out in any desired manner, such as, for example, by algorithms executable by processing circuitry.

The analyzer 54 receives indications of the data that is to be communicated by the network station to a mobile station pursuant to performance of a communication service during a communication session. The indication of the characteristic includes, e.g., the amount of data that is to be communicated, or some type of indicia that, when analyzed by the analyzer, permits the communication requirements to communicate the data adequately to be analyzed. Indications of the results of the analysis performed by the analyzer are provided to the resource allocator.

The resource allocator operates to allocate communication resources across a plurality of radio carriers. In the exemplary implementation, a mobile allocation index offset and time slot combination is provided for each of the allocations made by the allocator. Resources are assignable upon successive, or sequential, time slots on different ones of the plurality of radio carriers associated with the mobile allocation index offsets. The number of radio carriers across which the allocations are made is dependent upon various factors, including the capabilities of the communication stations. That is to say, for an allocation to be permitted, the communication stations must be capable of communicating at the frequency of the radio carrier upon which the allocation is made. Allocations are further dependent upon factors including, e.g., resource availability, the indications of which are also applied to the radio resource control logic.

The resource allocator generates, or causes to be generated, control messages that are provided to the radio protocol stack, the baseband element, and the RF element to control their operation responsive to the allocation of resources made by the allocator.

The indication of the allocated resources is also provided to the allocation message generator 58. The allocation message generator is here shown to include a matrix representer 60 and an allocation message generator 62 that formats and forms an allocation message. Once generated, the allocation message is provided to one or more of the RF transceiver front ends 34 of the RF element 28. The RF transceivers communicate the allocation message to the mobile station to inform the mobile station of the allocated resources.

The receive chain portion of the mobile station 14 is shown in FIG. 1 to include structure analogous to the structure of the network station. The receive chain portion operates analogous to, but reverse to that of, the corresponding parts of the transmit chain portion of the network station.

The mobile station 14 is here shown to include an antenna transducer 64, an RF element 66, a baseband element 68, and a radio protocol stack 74. The RF element includes a plurality of transceiver front ends 76 with different ones of the transceivers being operable at different carrier frequencies.

The mobile station includes a multi-carrier radio resource control logic element 78, also of an embodiment of the present invention. The element 78 includes a detector 82 and a controller 84. The radio resource control logic element is coupled, at least functionally, to the radio protocol stack, here indicated by way of the lines 86 and 88, to the baseband element 92, and to the RF transceiver front ends of the RF element by way of the lines 94.

The detector 82 operates to detect the allocation message sent by the network station to the mobile station and received at the RF element. The detector operates to extract values contained in the allocation message, or otherwise operates to identify the communication resources to be allocated for the communication of the data, thereby to provide notification to the mobile station of the allocated resources. Detections made by the detector are provided to the controller. The controller operates to control operation of the mobile station so that the mobile station receives, and operates upon, data that is communicated during a communication session. The controller, for instance, controls operation of various elements of the mobile station to ensure that the elements are operable at the proper times to receive the data communicated upon the different carriers.

Figure 2:
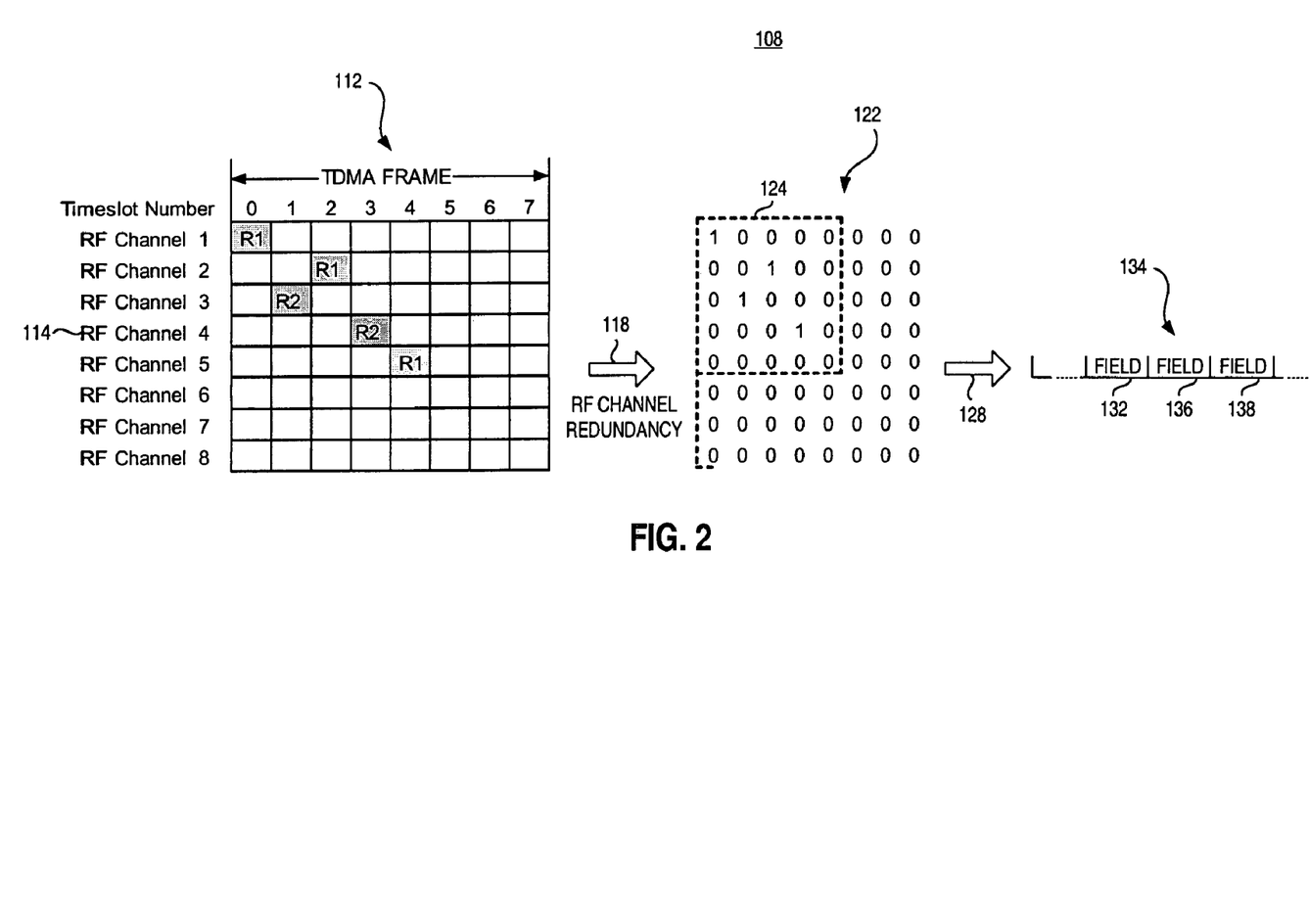
FIG. 2 illustrates a representation of a matrix formed pursuant to operation of an embodiment of the present invention that identifies communication resources allocated to the communication of data in the communication system shown in FIG. 1.

FIG. 2 illustrates a representation, shown generally at 108, that shows pictorially a manner by which the matrix representer forms a matrix representation of allocations of communication resources pursuant to an exemplary resource allocation. The exemplary resource allocation is indicated at the left side part (as shown) of the representation. A single TDMA frame 112 is shown across a plurality of RF carriers 114, designated as RF channels 1-8. Channel allocations are indicated by R1 and R2 at five contiguous time slots on different ones of the carriers, identified as channels 1-5.

Mapping, indicated by the arrow 118, is performed to create, first, an 8× matrix 122 shown at the right side part (as shown) of the representation. The matrix representation shows a logical "1" when a resource allocation is made during a time slot upon a carrier and a logical "0" if no allocation is made during the corresponding time slot. A first sub-matrix 124 is also shown in the figure, here formed of rows and columns that include a logical "1" value. The sub-matrix 124 is representative generally of a manipulated matrix formable by the matrix representer as a result of matrix manipulation of the larger matrix 122. In other exemplary allocations and other exemplary embodiments, other types of matrix manipulations are performed to form a matrix of reduced size or form. Time slots and RF channel redundancies are removed in the exemplary example.

The allocation message generation element 61 (shown in FIG. 1) is provided with, here indicated by the arrow 128, with the values of the matrix representation and uses the values to populate a field, here field 132, of an allocation message 134 that is generated by the allocation message generation element. The allocation message, once sent by the network station to the mobile station, notifies the mobile station of the resource allocation.

In general operation, therefore, the network constructs a message containing a radio resource assignment matrix formed of RF channels or mobile allocation index offsets (MAIOs) together with downlink received time slots for each TDMA frame during which data is to be communicated.

In a further implementation, the allocation message formatted by the message generation element includes additional fields populated with additional information, such as the starting time, indicated by the field 136 and an indication of a validity period, indicated by the field 138, as well as other information, as appropriate. In the exemplary implementation, the starting time is an absolute, i.e., an explicit starting time or an implicit starting time. The starting time is identified, for instance, by an absolute frame number (AFN) or an indication of a starting time based upon another event, e.g., thirteen TDMA frames subsequent to a next slow associated control channel (SACCH) block, all as defined in the aforementioned operating specification.

The indication of the validity period, in the exemplary implementation, forms a time or a number of frames during which the resource allocation assignment remains valid.

Referring back again to FIG. 1, the radio resource control logic element 78 further includes an acknowledgement generator 144 that operates to generate an acknowledgment to acknowledge delivery of the allocation message. The acknowledgment generated by the acknowledgment generator is provided to a transmit chain portion (not shown) of the mobile station. And, the network station includes an acknowledgment detector 146, coupled to a receive chain portion (not shown) of the network station that acknowledges the acknowledgment message when delivered to the network station.

In exemplary operation, the allocation message generator, at selected intervals, generates new allocation messages, i.e., reallocation messages, that update, or override, earlier-made and transmitted allocation messages. The matrix representer receives updated allocation information, forms matrix representations thereof, and provides the matrix representations of the updated, or new, allocation to the allocation message generation element.

The allocation, i.e., assignment, message is sent, for instance, in a packet time slot reconfigure message to inform the mobile station that its previously assigned radio resource assignment shall expire and to use a newly-generated, or updated allocation. In an alternate embodiment, a specifically constructed reassignment modification message is sent on the packet associated control channel (PACCH), also as defined in the aforementioned operating specification. An allocation or reallocation message is modified and retransmitted to the mobile station at selected, e.g., periodic, intervals during a downlink temporary block flow (TBF), e.g., at every SACCH period (480 ms) or other such period.

Figure 3:
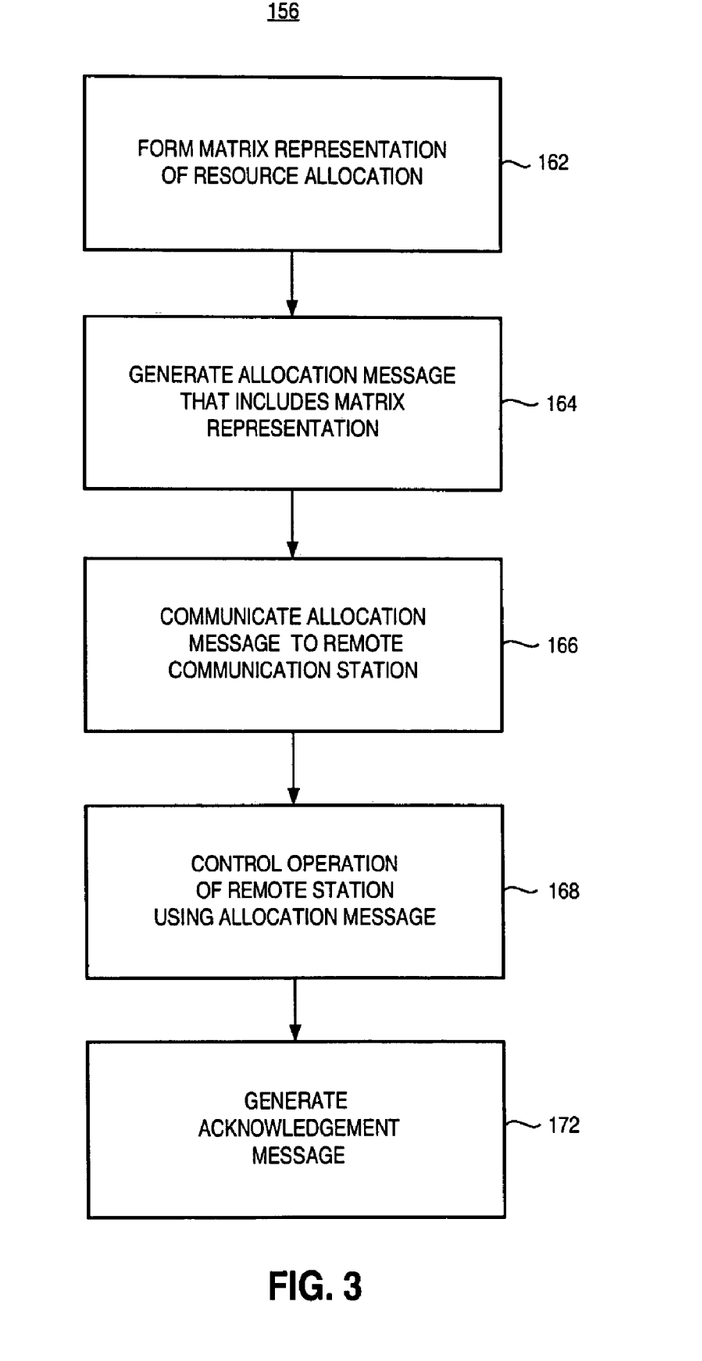
FIG. 3 illustrates a method flow diagram listing the method of operation of an embodiment of the present invention.

FIG. 3 illustrates a method flow diagram, shown generally at 156, representative of the method of operation of an embodiment of the present invention. The method provides notification of a communication resource allocation pursuant to communication of data.

First, and as indicated by the block 162, a matrix representation of the communication resource allocation is formed. The communication resource allocation is made across a plurality of radio carriers.

Then, and as indicated by the block 164, an allocation message is generated. The allocation message includes the matrix representation of the communication resource allocation. The allocation message is for communication to provide the notification of the communication resource allocation pursuant to the communication of the data.

Thereafter, and as indicated by the block 166, the allocation message is communicated to a remote station to notify the remote station of the communication resource allocation. And, as indicated by the block 168, the allocation message is used at the remote station to control operation thereof pursuant to the communication of the data thereto. Block 172 further indicates the generation and communication of an acknowledgment message acknowledging, by the remote station, the delivery of the acknowledgment message thereto.

Thereby, through transmission of an allocation message that includes a matrix representation of communication resource allocations made to communicate data, the communication stations that are parties to a communication session are notified of the allocation of the communication resources.

The previous descriptions are of preferred examples for implementing the invention, and the scope of the invention should not necessarily be limited by this description. The scope of the present invention is defined by the following claims.

What is claimed is:

1. Apparatus for providing notification of communication resources allocated for communication of data, the allocated communication resources being comprised of a plurality of Radio Frequency (RF) carriers and a plurality of frames, wherein each of the frames being a representation of a plurality of time slots associated with each of the plurality of RF carriers, said apparatus comprising:
a matrix representer adapted at least to receive an indication of the assignable communication resource allocation for the communication of data, said matrix representer configured to perform a mapping of the assignable communication resource allocation to form a sub-set of the assignable communication resource, the sub-set being representative of less than all of the available communication resources received at said matrix representer; and
a message generator adapted to receive the sub-set representation of the communication resource allocation assignment made by said matrix representer, said message generator configured to generate an allocation assignment message that includes logical values of the sub-set representation of the assignable communication resource allocation across at least two of the RF carriers and the representation of time slots for each of the included RF carriers.

2. The apparatus of claim 1 wherein the message generator is further configured to identify in the allocation assignment message staffing indicia at which the assignable communication resource allocation commences.

3. The apparatus of claim 1 wherein the message generator is further configured to identify in the allocation message duration indicia identifying a duration period of the assignable communication resource allocation.

4. The apparatus of claim 1 wherein the message generator is further configured to identify in the allocation assignment message a staffing time identifying a time at which the assignable communication resource allocation commences, the staffing time identified in terms of its relationship to an event defined in an operating specification pursuant to which the apparatus operates.

5. The apparatus of claim 1 wherein the message generator is further configured to generate a resource allocation assignment termination message that identifies termination of the assignable communication resource allocation.

6. The apparatus of claim 1 wherein said message generator is further configured to generate a reallocation assignment message that includes a sub-matrix representation of an assignable communication resource allocation, the reallocation assignment message for communication to provide notification of the assignable communication resource reallocation.

7. The apparatus of claim 6 further characterized by an acknowledgment detector configured to detect acknowledgment of successful communication of the reallocation assignment message.

8. The apparatus of claim 1 wherein said message generator generates the allocation assignment message at selected intervals.

9. Apparatus for a communication station operable for the communication of data across a plurality of RF carriers and a frame having a representation of a plurality of time slots, said apparatus comprising:
a detector configured to detect an allocation assignment message delivered to the communication station, the allocation assignment message including a representation of less than all of the available communication resources and formed of a mapping of the assignable communication allocation across the plurality of mobile allocation index offsets and the plurality of time slots including logical values indicating whether a allocation assignment is made during a corresponding mobile allocation index offset and time slot and
a controller adapted to receive an indication of detected mobile allocation index offset and plurality of time slots by the detector, said controller configured to control operation of the communication station responsive to the detected mobile allocation index offset and plurality of time slots by the detector.

10. The apparatus of claim 9 further comprising an acknowledgment generator adapted to receive indication of delivery of the allocation assignment message, said acknowledgment generator configured to generate an acknowledgment that acknowledges delivery of the allocation assignment message.

11. A method for providing notification of an assignable communication allocation for the communication of data across a plurality of Radio Frequency (RF) carriers and a frame having a representation of a plurality of time slots, said method characterized by the operations of:
forming at least two logical value sets representative of the assignable communication allocation indicating whether a resource allocation assignment is made for each of the RF carriers and the associated time slots of each of the RF carrier, the at least two logical value sets being representative of less than all of the available communication resources; and generating an allocation assignment message that includes the at least two logical sets representative of the assignable communication resource allocation and associated RF carriers, the allocation assignment message for communication to provide the notification of the assignable communication resource allocation assignment pursuant to the communication of the data.

12. The method of claim 11 farther characterized by the operation of controlling operation of the receiving station pursuant to the communication of the data thereto.

13. The method of claim 11 further characterized by the operation of acknowledging receipt of the assignment message at the receiving station.

14. The method of claim 11, wherein the sub-set representation of the assignable communication resource allocation is formed during said operation of forming responsive to an indication of the assignable communication resource allocation made for the communication of the data.

15. The method of claim 11 wherein the allocation assignment message formed during said operation of forming further identifies a staffing indicia at which the assignable communication resource allocation commences.

16. The method of claim 11 wherein the allocation assignment message formed during said operation of forming further identifies a duration period of the assignable communication resource allocation.

17. The method of claim 11 wherein the allocation assignment message formed during said operation of forming farther identifies a staffing time that identifies a time at which the assignable communication resource allocation commences, the starting time identified in terms its relationship to an event defined in an operating specification pursuant to which the method is performed.

18. The method of claim 11 wherein the sub-set representation of the assignable communication resource allocation being in the form of a matrix.

19. The method of claim 11 wherein the sub-set representation of the assignable communication resource allocation being in the form of an array.

20. The method of claim 11 wherein the sub-set representation of the assignable communication resource allocation being in the form of a table.

* * * * *

UNITED STATES PATENT AND TRADEMARK OFFICE
CERTIFICATE OF CORRECTION

PATENT NO. : 7,583,640 B2
APPLICATION NO. : 11/271520
DATED : September 1, 2009
INVENTOR(S) : Pecen et al.

It is certified that error appears in the above-identified patent and that said Letters Patent is hereby corrected as shown below:

Col. 9 in line 3 of claim 2, please delete "staffing" and insert therefor:

--starting--.

Col. 10 in line 3 and line 5 of claim 4, please delete "staffing" and insert therefor:

--starting--.

Col. 10 in line 3 of claim 15, please delete "staffing" and insert therefor:

--starting--.

Col. 11 in line 2 and 3 of claim 17, please delete "farther" and insert therefor:

--further--.

Col. 12 in line 3 of claim 17, please delete "staffing" and insert therefor:

--starting--.

Signed and Sealed this

Seventeenth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,583,640 B2 Page 1 of 1
APPLICATION NO. : 11/271520
DATED : September 1, 2009
INVENTOR(S) : Pecen et al.

It is certified that error appears in the above-identified patent and that said Letters Patent is hereby corrected as shown below:

Col. 9, line 66, claim 2, please delete "staffing" and insert therefor:

--starting--.

Col. 10, lines 7 and 9, claim 4, please delete "staffing" and insert therefor:

--starting--.

Col. 11, line 21, claim 15, please delete "staffing" and insert therefor:

--starting--.

Col. 12, lines 6 and 7, claim 17, please delete "farther" and insert therefor:

--further--.

Col. 12, line 7, claim 17, please delete "staffing" and insert therefor:

--starting--.

This certificate supersedes the Certificate of Correction issued November 17, 2009.

Signed and Sealed this

Fifteenth Day of December, 2009

David J. Kappos
*Director of the United States Patent and Trademark Office*